United States Patent [19]

Merz

[11] Patent Number: 4,664,806
[45] Date of Patent: May 12, 1987

[54] ANIONICALLY MODIFIED POLYSACCHARIDES CHROMATOGRAPHY AGENTS

[75] Inventor: Jürg Merz, Biel-Benken, Switzerland

[73] Assignee: Ciba-Geigy Corporation, Ardsley, N.Y.

[21] Appl. No.: 820,496

[22] Filed: Jan. 17, 1986

[30] Foreign Application Priority Data

Jan. 22, 1985 [CH] Switzerland .............................. 277/85

[51] Int. Cl.⁴ .............................................. B01D 15/08
[52] U.S. Cl. .................................. 210/635; 210/198.2; 210/502.1; 502/404; 536/4.1; 536/6.2; 536/18.6; 536/30
[58] Field of Search ................... 210/635, 198.2, 502.1; 536/4.1, 30, 6.2, 18.6; 502/404

[56] References Cited

U.S. PATENT DOCUMENTS

| | | | |
|---|---|---|---|
| 4,076,930 | 2/1978 | Ellingboe et al. | 210/635 |
| 4,086,222 | 4/1978 | Lindquist et al. | 210/635 |
| 4,094,832 | 6/1978 | Soderberg | 210/635 |
| 4,094,833 | 6/1978 | Johansson et al. | 210/635 |
| 4,178,438 | 12/1979 | Haase et al. | 536/30 |
| 4,263,146 | 4/1981 | Wegmüller et al. | 210/679 |
| 4,577,013 | 3/1986 | Merz et al. | 536/43 |

Primary Examiner—Ernest G. Therkorn
Attorney, Agent, or Firm—Kevin T. Mansfield

[57] ABSTRACT

Novel chemically modified anionic polysaccharides which contain acid radicals of the formula

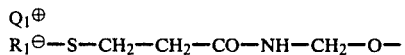

attached to the polysaccharide component, wherein $R_1^\ominus$ is carboxyalkyl or dicarboxyalkyl containing 1 to 5 carbon atoms in the alkyl moiety, or is carboxyphenyl or ketocarboxymethyl, and $Q_1^\oplus$ is a water-soluble cation, are obtained by reacting the polysaccharides with compounds that contain N-methylolamide groups, in particular with novel compounds of formula

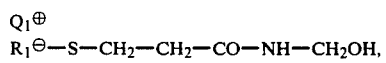

wherein $R_1^\ominus$ and $Q_1^\oplus$ have the given meanings, and are used for purifying effluents and, in particular, for the separation by chromatography of mixtures of substances which contain amphoteric or cationic components.

6 Claims, No Drawings

ANIONICALLY MODIFIED POLYSACCHARIDES CHROMATOGRAPHY AGENTS

The present invention relates to polysaccharides which have been anionically modified by chemical means.

Cellulosic materials which have been anionically modified by chemical means and which are used in effluent purification, in particular for removing dyes, are disclosed in German "Offenlegungsschrift" No. 2,925,689. These known anionically modified cellulosic materials are polysaccharides which contain $\beta$-glycosidic linkages. The acid radicals of the known anionically modified cellulosic materials, which radicals are attached to the cellulosic component, have in particular the formula $$Z-CH_2-CH_2-CO-NH-CH_2-O-, \quad (1)$$

wherein Z is carboxyl or the acid radical of a polybasic inorganic oxygen-containing acid, e.g. sulfuric acid or phosphoric acid.

It has now been found that per se novel polysaccharides which have been modified by chemical means and which contain $\alpha$-glycosidic and/or $\beta$-glycosidic linkages also have the advantageous properties that make it possible to use them e.g. as stationary phase in the chromatographic separation of mixtures of substances which carry an amphoteric or cationic charge, which polysaccharides contain acid radicals of formula $$Q_1^\oplus \quad (2)$$
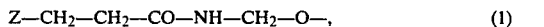

attached to the polysaccharide component, wherein $R_1^\ominus$ is carboxyalkyl or dicarboxyalkyl having 1 to 5 carbon atoms in the alkyl moiety, carboxyphenyl or ketocarboxymethyl, and $Q_1^\oplus$ is a water soluble cation.

Further objects of the present invention are the process for the preparation of the anionically modified polysaccharides, the use thereof for separating mixtures of substances, chromatographic methods of separation in which said anionically modified polysaccharides are employed, methylol compounds as intermediates for obtaining the anionically modified polysaccharides, and a process for the preparation of said methylol compounds.

Representatives of polysaccharides which contain $\alpha$-glycosidic linkage are in particular starch and derivatives thereof, for example dextran and the dextrins, in particular white dextrin. Also suitable are polysaccharides which do not exclusively contain $\alpha$-glycosidic linkages, for example agarose, which consists of alternating D-galactopyranose units linked by $\beta$-1,3 bonds and 3,6-anhydro-L-galactopyranose units linked by $\alpha$-1,4 bonds. The polysaccharides of this invention may be completely or partially crosslinked. Uncrosslinked dextrins, uncrosslinked agarose, crosslinked dextrins, crosslinked dextran or crosslinked agarose, which are anionically modified and contain $\alpha$-glycosidic linkages, are preferred. Of preeminent interest, however, is cellulose which contains $\beta$-glycosidic linkages, in particular the products which are commercially available under the registered trademarks SOLCA FLOC® BW 60, BW 100 and BW 200, SERVA® HBS and S & S® 123.

The acid radicals of preferred anionically modified polysaccharides correspond to the formula

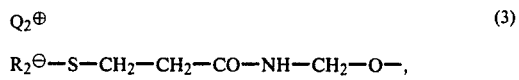

wherein $R_2^\ominus$ is

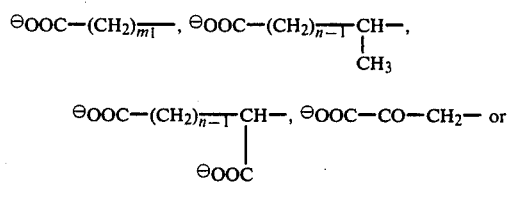

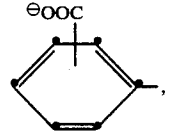

$Q_2^\oplus$ is hydrogen, an alkali metal cation or an ammonium cation, $m_1$ is an integer from 1 to 5 and n is 1 or 2; and, in particular, to the formula

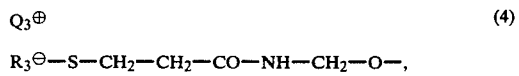

wherein $R_3^\ominus$ is

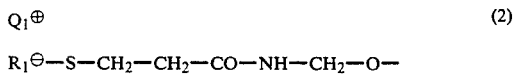

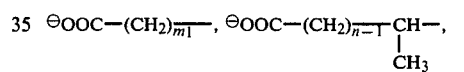

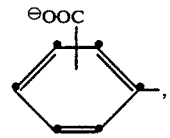

and $Q_3^\oplus$ is $H^\oplus$, $K^\oplus$, $Na^\oplus$ or $NH_4^\oplus$, $m_2$ is 1, 2 or 3 and n is 1 or 2; and, most particularly, to the formula

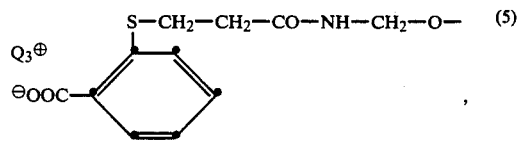

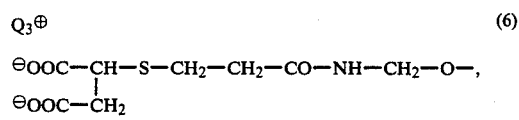

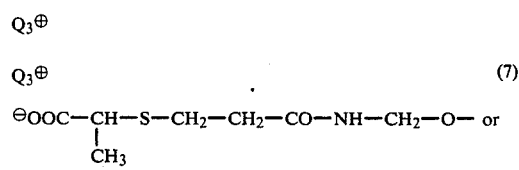

$$Q_3^\oplus \qquad (8)$$

$$^\ominus OOC-CH_2-S-CH_2-CH_2-CO-NH-CH_2-O-,$$

wherein $Q_3^\oplus$ is as defined above.

The acid radicals of the anionically modified polysaccharides which are of preeminent interest have the formula $$Na^\oplus \qquad (9)$$

$$^\ominus OOC-CH_2-S-CH_2-CH_2-CO-NH-CH_2-O-.$$

The anionically modified polysaccharides of this invention normally have a degree of substitution, based on the primary —CH$_2$OH group of a saccharose unit, of about 0.1 to 0.95, preferably of 0.2 to 0.85. The degree of substitution is determined on the basis of the sulfur or nitrogen content of the modified polysaccharide.

The preparation of the anionically modified polysaccharides of this invention generally comprises reacting a polysaccharide of the indicated kind as starting material, in a manner which is known per se, with a compound carrying an N-methylolamide group. Examples of suitable N-methylol compounds are those of the formula $$Q_1^\oplus \qquad (10)$$

$$R_1^\ominus-S-CH_2-CH_2-CO-NH-CH_2-OH$$

wherein $R_1^\ominus$ and $Q_1^\oplus$ have the given meanings.

The compounds of formula (10) are novel and are prepared by methods which are known per se by reacting a compound of formula $$R_1-SH \qquad (11)$$

wherein $R_1$ has the given meanings, first with acrylamide and then with formaldehyde or a formaldehyde donor, preferably in equimolar amounts.

In the above process, the addition of acrylamide to the compound of formula (11) is preferably carried out in aqeuous alkaline medium in the pH range from about 9 to 11 and in the temperature range from about 30° to 100° C.

The subsequent methylolation is also conveniently carried out in aqueous alkaline medium in the pH range from about 8 to 11, preferably at a temperature not exceeding 100° C., most preferably in the temperature range from about 30° to 60° C. A suitable alkali is e.g. sodium methylate, but is preferably ammonia or potassium hydroxide or, most preferably, sodium hydroxide. The formaldehyde donor is e.g. trioxane, hexamethylenetetramine or, preferably, paraformaldehyde.

Depending on the meaning of R$_1$, the compound of formula (11) will be e.g. mercaptoacetic acid (also known as thioglycolic acid), 2-mercaptopropionic acid (also known as thiolactic acid), 3-mercaptopropionic acid, mercaptobutyric acid, mercaptoisobutyric acid, mercaptocapronic acid, mercaptosuccinic acid (also known as thiomalic acid), mercaptomalonic acid, mercaptophthalic acid (also known as thiosalicylic acid), mercaptoterephthalic acid or mercaptopyruvic acid. Preferred compounds of formula (11) are thiosalicylic acid, thiolactic acid, thiomalic acid and, in particular, thioglycolic acid.

In a further embodiment of the process for the preparation of the anionically modified polysaccharides of this invention, the polysaccharide of the indicated kind is reacted first with methylolacrylamide as methylol compound (prepared from acrylamide and formaldehyde or a formaldehyde donor, e.g. paraformaldehyde, hexamethylenetetramine or trioxane at a temperature not exceeding 100° C., preferably at 20°−−60° C., in aqueous medium and optionally in the presence of a basic catalyst, e.g. sodium methylate or, preferably, sodium hydroxide) to give an acrylic-modified polysaccharide as intermediate, after which the anionic group is introduced by addition of the compound of formula (11) at the double bond of the intermediate which contains acrylic-modified, non-ionic components of the formula $$-O-CH_2-NH-CO-CH=CH_2, \qquad (12)$$

which are attached to the polysaccharide component.

The polysaccharide of the indicated kind and the methylol compound of formula (10) are preferably stirred for about 20 to 40 minutes, in aqueous medium at pH 2 to 6 and at room temperature, e.g. 15° to 25° C., then dried at 70° to 80° C., and finally the product is subjected to a heat treatment for 1 to 2 hours at 100° to 150° C. In a further preferred embodiment of the preparatory process, the cellulose powder and methylolacrylamide, as methylol compound, are stirred for about 20 to 40 minutes in aqueous medium at pH 2 to 6 and at 15° to 50° C., preferably in the presence of a polymerisation inhibitor such as hydroquinone, then dried at 70° to 80° C., and the product is thereafter subjected to a heat treatment for 1 to 2 hours at 100° to 150° C., and, in a final step, the ionic group is introduced by addition of a compound of the formula (11) to the double bond of the acrylic-modified intermediate in aqueous medium, at pH 7.0 to 12.5, preferably at pH 9.0 to 12.0, and at 15° to 70° C., over about a ½ hour to 3 hours, and finally the ionically modified polysaccharide is dried at 70° to 80° C. In both variants of the process, it is advantageous to store the polysaccharide impregnated with the methylol compound at room temperature, e.g. 15° to 30° C. for at least 24 hours (cold storage process) before the drying step at 70° to 80° C.

The ionically modified polysaccharides of the present invention are used for purifying effluents as described for example in German "Offenlegungsschrift" No. 2,925,689, in which ionically modified cellulosic materials are employed. For effluent purification, it is possible to remove e.g. dyes and, in general, also cations, especially heavy metal cations such as cadmium, mercury and chromium cations. Preferably, however, the anionically modified polysaccharides are particularly suitable for separating mixtures of substances, usually in the form of aqueous solutions, which contain at least an amount of amphoteric or cationic components. The per se known chromatographic method of separating such substances comprises using the ionically modified polysaccharides of this invention, which have ion exchange properties, as stationary phase.

In this process, the anionically modified polysaccharides are used e.g. batchwise in the batch process (also called batch operation). Also suitable is the continuous fluidised bed process. However, it is preferred to use the anionically modified polysaccharides as the staionary phase of chromatographic separating columns (column process). In the fluidised bed process, the stationary phase is constantly kept in motion, in contrast to the fixed bed process, which is used e.g. in batchwise operation or in the column process. A chromatographic method of separation will be understood as meaning in the context of this invention a reversible process in which, after separation, the separated substances can be recovered from the stationary phase and the separating material can be reconverted to its original form by regeneration (see for example pages 3 to 24 of the monograph "Ionenaustauscher" by K. Dorfner, 3rd. edition 1970, W. de Gruyter & Co.).

In particular, mixtures of organic substances of any composition can be separated into their components, provided at least one of the components of said mixtures of substances carries a cationic or amphoteric charge. Typical examples of possible mixtures of substances comprise technical mixtures of dyes, pharmaceuticals (enrichment or purification of fermentation broths), additives for plastics, textile auxiliaries, wetting agents and dispersants such as lignin derivatives.

A particularly interesting utility of the anionically modified polysaccharides of this invention is the chromatographic separation of ligninamines, i.e. reaction products of lignin and diethylamine, which are commercially available (e.g. INDULIN ® brands). Such ligninamines are known e.g. as additives for bitumen emulsions and are important in road construction.

The chromatographic separation of fermentation broths for the preparation of pharmaceuticals such as Eglin C is of particular importance.

The most important advantage of the ionically modified polysaccharides of the present invention is that, on account of their good separating properties and their good flow properties, they can be readily used as stationary phase in chromatographic methods of separation, in which connection the entire pH range from about 1 to 13 can be utilised employing both alkaline and acid eluants.

In the following Preparatory Methods and subsequent Examples, parts and percentages are by weight.

PREPARATION OF INTERMEDIATES (METHYLOL COMPOUNDS)

EXAMPLE 1

3-carboxymethylthio-N-hydroxymethylpropionamide

To a solution of 106.6 parts (1.5 moles) of acrylamide in 250 parts of deionised water are added, over 10 minutes, 138 parts (1.5 moles) of mercaptoacetic acid. The temperature of the reaction mixture rises to 35° C. in the course of the ensuing exothermic reaction. When the addition of the mercaptoacetic acid is complete, the pH of the reaction mixture is adjusted to 10.0 by addition of 100 parts of 30% aqueous sodium hydroxide solution. The reaction mixture is then heated to reflux temperature of about 98° C. and kept for one hour at this temperature and at pH 10.0, if necessary by adding sodium hydroxide solution in portions, and subsequently cooled to 20° C. The pH of the reaction mixture is lowered from the original value of 10.0 to 9.5 by addition of aqueous 1N hydrochloric acid solution. Then 45 parts (1.5 moles) of paraformaldehyde are added to the reaction mixture, which is thereafter heated to 50° C. and kept at this temperature for 16 hours. Yield: 284 parts of a 45% aqueous, slightly viscous yellowish solution of the methylolated reaction product of formula

$Na^\oplus$ (13)

$^\ominus OOC-CH_2-S-CH_2-CH_2-CO-NH-CH_2OH$

EXAMPLE 2

3-(2-carboxyphenyl)thio-N-hydroxymethylpropionamide

The procedure of Example 1 is repeated, using 35.5 parts (0.5 mole) of acrylamide in 100 parts of deionised water, adding 77.1 parts (0.5 mole) of 2-mercaptophthalic acid over 20 minutes, adjusting the pH of the reaction mixture to 10.0 with 90 parts of 30% aqueous sodium hydroxide solution, and adding 15 parts (0.5 mole) of paraformaldehyde to the reaction mixture at pH 9.5 after addition of hydrochloric acid. Yield: 328 parts of a 42% aqueous, slightly viscous yellowish solution of the methylolated reaction product of formula

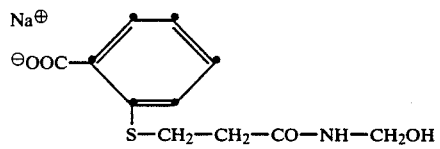

EXAMPLE 3

3-(1,3-dicarboxyethyl)thio-N-hydroxymethylpropionamide

The procedure of Example 1 is repeated, using 35.5 parts (0.5 mole) of acrylamide in 100 parts of deionised water, adding 75 parts (0.5 mole) of mercaptosuccinic acid over 20 minutes, adjusting the pH of the reaction mixture to 10.0 with 90 parts of 30% aqueous sodium hydroxide solution, and adding 50 parts (0.5 mole) of aqueous 30% paraformaldehyde solution to the reaction mixture at pH 9.5 after addition of hydrochloric acid. Yield: 365 parts of a 37% aqueous, slightly viscous yellowish solution of the methylolated reaction product of formula

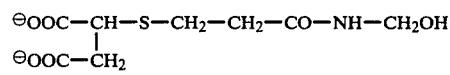

$^\oplus Na$ (15)

$^\ominus OOC-CH-S-CH_2-CH_2-CO-NH-CH_2OH$
$\quad\quad\quad |$
$^\ominus OOC-CH_2$ $^\oplus Na$.

EXAMPLE 4

3-(1-carboxyethyl)thio-N-hydroxymethylpropionamide

The procedure of Example 1 is repeated, using 35.5 parts (0.5 mole) of acrylamide in 100 parts of deionised water, adding 53 parts (0.5 mole) of 2-mercaptopropionic acid over 20 minutes, adjusting the pH of the reaction mixture to 10.0 with 90 parts of 30% aqueous sodium hydroxide solution, and adding 15 parts (0.5 mole) of paraformaldehyde to the reaction mixture at pH 9.5 after addition of hydrochloric acid. Yield: 304 parts of a 43% aqueous, slightly viscous yellowish solution to the methylolated reaction product of formula

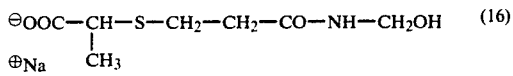

Preparation of anionically modified polysaccharides

EXAMPLE 5

20 parts of a microcrystalline Kraft cellulose powder having a degree of polymerisation of 530 and consisting of particles with a BET surface area of 0.88 m$^2$/g and a degree of swelling in water at 20° C. of 5.6 ml/g, are mixed with 100 parts of the 45% aqueous solution of the methylolated reaction product of Example 1 for 30 minutes at 20° C., and the pH of the mixture is then adjusted to 3.0 with aqueous 1N hydrochloric acid solution. The cellulose suspension is then filtered and the impregnated cellulose powder is stored first for 24 hours at 20° C. and then dried under reduced pressure at 70° C. The condensation of the methylolated reaction product with the hydroxyl groups of the cellulose is carried out for 75 minutes at 130° C. The treated cellulose powder is washed first with a 10% aqueous solution of sodium carbonate having a pH of 11.0, and then with deionised water until a sample of the wash water has a pH of 7–8, and subsequently dried at 70° C. under reduced pressure and comminuted in a mortar. Yield: 22.5 parts of a finely particulate, anionically modified cellulose material in the form of a yellowish powder that has an ion exchange capacity of 3.8 meq/g, a degree of substitution of 0.33 and very good flow properties, and which contains anionically modified saccharide units of the formula

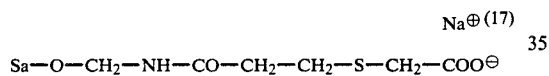

wherein Sa is a saccharide residue.

The method of determining the ion exchange capacity is described e.g. on page 253 of the monograph "Cellulosic Ion Exchangers" by E. A. Peterson (ed. 1980, Elsevier).

EXAMPLE 6

The procedure of Example 5 is repeated, using 20.5 parts of SOLCA FLOC ® BW 100 cellulose powder, adjusting the cellulose suspension with hydrochloric acid to 3.5 (instead of 3.0), and storing the impregnated cellulose powder at 20° C. for 16 hours (instead of 24 hours). The material is washed, dried and comminuted as described in Example 5, affording 23.5 parts of a finely particulate, anionically modified cellulosic material in the form of a yellowish powder having an ion exchange capacity of 1.4 meq/g, a degree of substitution of 0.35 and very good flow properties, and which contains anionically modified saccharide units of formula (17).

EXAMPLE 7

Step I 100 parts of the cellulose powder used as starting material in Example 5 are mixed with 500 parts of a 60% aqueous solution of monomethylolacrylamide and 0.1 part of hydroquinone. This mixture is adjusted to pH 3.5 with aqueous 1N hydrochloric acid solution and gently stirred for 30 minutes at 20° C. The suspension is then filtered. The still moist impregnated cellulosic material is stored for 24 hours at 20° C. and then dried for 5 hours at 70° C. under reduced pressure. The condensation reaction is then carried out for 60 minutes at 120° C. The material is washed, dried and comminuted as described in Example 5, affording 180 parts of an acrylic modified cellulosic material in the form of a yellow powder that has a degree of substitution of 0.9 and contains saccharide units of the formula

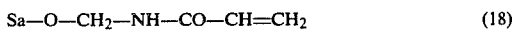

wherein Sa is a saccharide residue.

Step II 20 parts of the acrylic modified cellulosic material obtained in step I are suspended in 80 parts of deionised water. To this suspension are added 20 parts of mercaptoacetic acid. The pH of the reaction mixture is adjusted to 10.0 by addition of 30% aqueous sodium hydroxide solution, the temperature rising to 50° C. in the course of the ensuing exothermic reaction. The suspension is then heated to 60° C., kept at this temperature for 1 hour and filtered. The cellulosic material is washed, dried and comminuted as described in Example 5, affording 21 parts of an anionically modified cellulosic material in the form of a yellowish powder that has an ion exchange capacity of 1.0 meq/g, a degree of substitution of 0.27 and very good flow properties, and which contains anionically modified saccharide units of formula (17).

EXAMPLE 8

Step I 50 parts of white dextrin are suspended in 250 parts of a 60% aqueous solution of monomethylolacrylamide and 0.025 part of hydroquinone. This suspension, which has a pH of 2.5, is stirred for 30 minutes at 20° C. and then filtered. The still moist impregnated dextrin is stored for 24 hours at 20° C. and then dried at 70° C. under reduced pressure. The condensation reaction is carried out for 60 minutes at 120° C. The material is washed, dried and comminuted as described in Example 5, affording 50 parts of an acrylic modified dextrin in the form of a yellowish powder that has a degree of substitution of 0.95 and contains modified saccharide units of formula (18).

Step II 20 parts of the acrylic modified dextrin obtained in step I are suspended in 80 parts of deionised water. To this suspension are added 20 parts of mercaptoacetic acid. The pH of the reaction mixture is adjusted to 10.0 by addition of 30% aqueous sodium hydroxide solution, the temperature of the reaction mixture rising to 50° C. in the course of the ensuing exothermic reaction. The suspension is then heated to 60° C. and stirred for 1 hour at this temperature. The suspension is then filtered. The material is washed, dried and comminuted as described in Example 5, affording 20 parts of an anionically modified dextrin in the form of a yellowish powder that has an ion exchange capacity of 5.1 meq/g, a degree of substitution of 0.6 and very good flow properties, and which contains anionically modified saccharide units of formula (17).

EXAMPLE 9

Step I 20 parts of agarose are mixed with 50 parts of a 60% aqueous solution of monomethylolacryalamide and 0.1 part of hydroquinone. This mixture is adjusted to pH 3.0 with an aqueous 1N hydrochloric acid solution and gently stirred at 20° C. for 30 minutes. The suspension is then filtered. The still moist impregnated agarose is stored for 24 hours at 20° C. and then dried at 60° C. under reduced pressure. The condensation reaction is then carried out for 60 minutes at 120° C. The material is washed, dried and comminuted as described in Example 5, affording 25 parts of an acrylic modified agarose in the form of a yellowish powder that has a degree of substitution of 0.95 and contains modified saccharide units of formula (18).

Step II 12 parts of the acrylic modified agarose obtained in step I are suspended in 120 parts of deionised water and 12 parts of mercaptoacetic acid are added to this suspension over 10 minutes. The temperature of the reaction mixture rises to 30° C. in the course of the ensuing exothermic reaction. The pH of the reaction mixture is adjusted to 10.0 by addition of 30% aqueous sodium hydroxide solution and the reaction mixture exotherms to 50° C. The suspension is then heated to 60° C., kept at this temperature for 1 hour and filtered, affording 13 parts of a yellow powder which is washed (until the pH of the wash water is 8.0), dried and comminuted as described in Example 5. The colourless, finely particulate, anionically modified agarose powder has an ion exchange capacity of 2.5 meq/g, a degree of substitution of 0.3 and very good flow properties, and contains anionically modified saccharide units of formula (17).

EXAMPLE 10

10 parts of dextran powder crosslinked with epichlorohydrin SEPHADEX ® G 50) are mixed at 20° C. for 30 minutes with 50 parts of the 45% aqueous solution of the methylolated reaction product of Example 1 and the pH of the mixture is then adjusted to 3.0 with an aqueous 1N hydrochloric acid solution. This moist crosslinked dextrin is first stored at 20° C. for 24 hours and then dried at 70° C. under reduced pressure. The condensation of the methylolated reaction product with the hydroxyl groups of the crosslinked dextrin is carried out for 75 minutes at 130° C. The material is washed, dried and comminuted as described in Example 5, affording 17 parts of an anionically modified, crosslinked dextrin in the form of a finely particulate yellowish powder that has an ion exchange capacity of 4.5 meq/g, a degree of substitution of 0.8 and very good flow properties, and which contains anionically modified saccharide units of formula (17).

EXAMPLE 11

500 parts of agarose which is crosslinked with butanediol diglycidyl ether (SEPHAROSE® CL 6B, 6% aqueous suspension), in the form of a moist filter cake obtained after filtration and washing with deionised water, are mixed at 20° C. for 30 minutes with 180 parts of the 45% aqueous solution of the methylolated reaction product of Example 1. The pH of the mixture is then adjusted to 3.0 with an aqueous 1N hydrochloric acid solution. This moist crosslinked agarose powder is first stored at 20° C. for 24 hours and then dried at 70° C. under reduced pressure. The condensation of the methylolated reaction product with the hydroxyl groups of the crosslinked agarose is carried out for 75 minutes at 130° C. The material is washed, dried and comminuted as described in Example 5, affording 38 parts of an anionically modified, crosslinked agarose in the form of a finely particulate yellowish powder that has a an ion exchange capacity of 1.75 meq/g, a degree of substitution of 0.3 and very good flow properties, and which contains anionically modified saccharide units of formula (13).

EXAMPLE 12

The procedure of Example 5 is repeated, except that the cellulosic powder treated with the methylolated reaction product is washed with a 10% aqueous solution of potassium carbonate which has a pH of 11.0. The subsequent washing, drying and comminution of the cellulosic material is also carried out as described in Example 5, affording 22.5 parts of an anionically modified cellulosic material in the form of a finely particulate yellowish powder that has an iron exchange capacity of 1.30 meq/g, a degree of substitution of 0.25 and very good flow properties, and which contains anionically modified saccharide units of the formula

$$Sa-O-CH_2-NH-CO-CH_2-CH_2-S-CH_2-COO^{\ominus} \quad K^{\oplus} \quad (19)$$

wherein Sa is a saccharide residue.

EXAMPLE 13

The procedure of Example 5 is repeated, except that the cellulosic powder treated with the methylolated reaction product is washed with a 10% aqueous solution of ammonium carbonate which has a pH of 10.5. The subsequent washing, drying and comminution of the cellulosic material is also carried out as described in Example 5, affording 22 parts of an anionically modified cellulosic material in the form of a finely particulate yellowish powder that has an iron exchange capacity of 1.30 meq/g, a degree of substitution of 0.25 and very good flow properties, and which contains anionically modified saccharide units of the formula

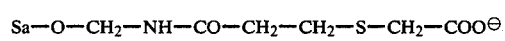

$$Sa-O-CH_2-NH-CO-CH_2-CH_2-S-CH_2-COO^{\ominus} \quad NH_4^{\oplus} \quad (20)$$

wherein Sa is a saccharide residue.

EXAMPLE 14

The procedure of Example 5 is repeated, using 20 parts of an agarose which has a gelling temperature of 42° C. and an average gel strength of 1500 g/m², adjusting the mixture of agarose and methylolated reaction product with 1N hydrochloric acid solution to pH 3.5 (instead of 3.0) and, after storing the impregnated agarose, carrying out the condensation of the methylolated reaction product with the hydroxyl groups of the agarose for 45 (instead of 75) minutes at 130° C. The agarose treated in this manner is then washed first with deionised water and then with 10% aqueus sodium carbonate solution until the pH of a sample of the wash water is 10.0. The material is then washed with deionised water until the pH of a sample of the wash water is 8.0 and subsequently dried and comminuted as described in Example 5, affording 25 parts of an anionically modified agarose in the form of a finely particulate yellowish powder that has an ion exchange capacity of 2 meq/g, a degree of substitution of 0.33 and very good flow properties, and which contains anionically modified saccharide units of formula (17).

EXAMPLE 15

20 parts of dextran crosslinked with epichlorohydrin (see H. Determann, Gelchormatographie, page 17, Springer Verlag Berlin, 1967) (average molecular weight of the uncrosslinkied dextran: 40,000) are allowed to swell in 100 parts of deionised water. The supernatant water is removed by decantation and the slurry of the crosslinked dextran (instead of 20 parts of cellulosic powder) is treated, as described in Example 5, with the methylolated reaction product. The material is washed, dried and comminuted, affording 26 parts of anionically modified, crosslinked dextran in the form of a finely particulate, yellowish powder that has an ion exchange capacity of 5.3 meq/g, a degree of substitution of 0.90 and very good flow properties, and which contains anionically modified saccharide units of formula (17).

EXAMPLE 16

The procedure of Example 5 is repeated, using 25 parts of cellulose powder and 125 parts of a 42% aqueous solution of the methylolated reaction product of Example 2. The material is washed, dried and comminuted, affording 29 parts of anionically modified cellulosic material in the form of a finely particulate, yellowish powder that has an ion exchange capacity of 0.90 meq/g, a degree of substitution of 0.2 and very good flow properties, and which contains anionically modified saccharide units of formula

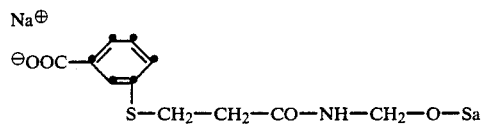

wherein Sa is a saccharide residue.

EXAMPLE 17

The procedure of Example 10 is repeated, using 25 parts of the dextran crosslinked with epichlorohydrin of Example 5 and 125 parts of a 42% aqueous solution of the methylolated reaction product of Example 2. The material is washed, dried and comminuted, affording 20 parts of anionically modified crosslinked dextran in the form of a finely particulate, colourless powder that has an ion exchange capacity of 5.10 meq/g, a degree of substitution of 0.89 and very good flow properties, and which contains anionically modified saccharide units of formula (21).

EXAMPLE 18

The procedure of Example 5 is repeated, using 25 parts of cellulose powder and 125 parts of a 37% aqueous solution of the methylolated reaction product of Example 3. The material is washed, dried and comminuted, affording 29 parts of anionically modified cellulosic material in the form of a finely particulate, colourless powder that has an ion exchange capacity of 0.54 meq/g, a degree of substitution of 0.23 and very good flow properties, and which contains anionically modified saccharide units of formula $$Na^{\oplus} \quad \quad (22)$$
$$^{\ominus}OOC-CH_2$$
$$|$$
$$^{\ominus}OOC-CH-S-CH_2-CH_2-CO-NH-CH_2-O-Sa$$
$$Na^{\oplus}$$

wherein Sa is a saccharide residue.

EXAMPLE 19

The procedure of Example 5 is repeated, using 25 parts of cellulose powder and 125 parts of a 43% aqueous solution of the methylolated reaction product of Example 4. The material is washed, dried and comminuted, affording 28 parts of anionically modified cellulosic material in the form of a finely particulate, colourless powder that has an ion exchange capacity of 0.58 meq/g, a degree of substitution of 0.25 and very good flow properties, and which contains anionically modified saccharide units of formula $$CH_3 \quad \quad (23)$$
$$|$$
$$^{\ominus}OOC-CH-S-CH_2-CH_2-CO-NH-CH_2-O-Sa$$
$$Na^{\oplus}$$

wherein Sa is a saccharide residue.

APPLICATION EXAMPLES

EXAMPLE 20

Separation of a commercially available ligninamine mixture 7 parts of the modified polysaccharide of Example 5 are suspended in 70 parts of distilled water and the suspension is stirred for 30 minutes at 20° C. The pH of the suspension is then 8.0. The suspension is then introduced into a glass chromatography column (diameter 1.27 cm, length 33 cm). The homogeneous bed of the modified polysaccharide, as the stationary phase, has a volume of 39 ml (filled height 31.5 cm). The modified polysaccharide is first washed for one hour with distilled water at a flow rate of 700 ml.hr.$^{-1}$.cm$^{-2}$ (counter-pressure of the column 1 to 2 bar). The column is then charged with 5 parts of a 0.5% aqueous solution of a commercially available ligninamine mixture which has a pH of 8.7. All the components of the ligninamine mixture are adsorbed on the modified polysaccharide at a flow rate of 100 ml.hr$^{-1}$.cm$^{-2}$.

The components of the ligninamine mixture are then separated by chromatography from the modified polysaccharide, as the stationary phase, using several eluants with increasing pH values as the mobile phase. A fraction collector, which separates the eluate into 4 ml fractions, is used for this purpose, the flow rate of the liquid phase through the stationary phase being 100 ml.hr$^{-1}$.cm$^{-2}$. The adsorption of each of the 4 ml fractions at 250 nm is determined in order to make it possible to compare concentrations in respect of components of the ligninamine mixture. The fractions which have no absorption are discarded. The fractions exhibiting absorption are collected. 5 components of the ligninamine mixture are thus eluted in the course of the separation process. The course of the chromatographic separation of the ligninamine mixture by means of the eluants used is indicated in the table below: Sörensen phosphate buffers are used for eluants with a pH value of 6, 7 and 8, borax buffers for eluants with a pH value of 9, 10 and 11, and an aqueous solution of potassium chloride/sodium hydroxide (TITRISOL ® buffer) is used for an eluant with a pH value of 13.

TABLE

| pH of the eluant | Eluate (ml) | Fractions No. | % of the mixture |
|---|---|---|---|
| 6.0 | 80 | I | 16% |
| 7.0 | 160 | II | — |
| 8.0 | 240 | III | 18% |
| 9.0 | 320 | IV | 28% |
| 10.0 | 400 | V | 30% |
| 11.0 | 480 | VI | 8% |
| 13.0 | 560 | VII | — |

Fraction I is virtually non-polar. Fraction II has the smallest and fraction VII the greatest polarity, while the polarity of fractions III to VI increases continuously.

When the separation of the ligninamine mixture has been concluded, using a total of 560 ml of eluant, the anionically modified polysaccharide in the chromatography column is washed with about 20 to 30 ml of aqueous 0.1N sodium hydroxide solution until the eluate has a pH 12 to 13. The regenerated anionically modified polysaccharide is washed with 50 to 100 ml of deionised water until the eluate has a pH of 8.0. The polysaccharide is then available as a regenerated, stationary phase for further chromatographic separations.

Similar results are obtained if the anionically modified polysaccharide according to any one of Examples 6, 10–18 or 19 or according to step II of Examples 7, 8 or 9 is employed as the stationary phase of the chromatography column.

EXAMPLE 21

Recovery of eglin C and $N^\alpha$-acetyl-eglin C from transformed S. cerevisiae GRF 18/pJDB 207R/PHO 5-EGL (a) Isolation of the transformed S. cerevisiae strain The isolation of the expression plasmid pJDB 207R/PHO5-EGL which contains the Eglin structural gene and of the yeast strain S. cerevisiae GRF 18 which is transformed with this plasmid is described in the pendent U.S. patent application Ser. No. 736,601 and can be performed as follows:

6 μg of plasmid pJDB207R/IF (α-3) (cf. European Patent Application No. 100,561) are digested to completion with restriction endonuclease BamHI. The resulting DNA fragments of 6.85 kb and 1.15 kb are isolated and dephosphated in Tris-Buffer with 4.5 units of calf intestine alkaline phosphatase (BOEHRINGER, Mannheim). The solution is adjusted to 150 mM NaCl and applied to a 100 μl bed of DE 52 (WHATMAN) anion exchanger equilibrated with 10 mM Tris-HCl pH 7.5 containing 150 mM NaCl and 1 mM EDTA. After washing with the same buffer, the DNA is eluted with 400 μl of 1.5M NaCl, 10 mM Tris-HCl pH 7.5, 1 mm EDTA and precipitated with ethanol. The large 6.85 kb BamHI fragment is separated from the small fragment on a 0.6% low melting agarose gel in Tris-borate-EDTA buffer pH 8.3.

10 μg of plasmid p31/R (cf. European Patent Application 100,561) are digested with restriction endonucleases EcoRI and BamHI. The resulting 3 fragments are separated on a 0.6% low melting agarose gel in Tris-borate-EDTA buffer pH 8.3. The 534 bp BamHI-EcoRI fragment, which contains the PHO5 promoter including the mRNA start sites, is isolated.

8 μg of plasmid pML 147 (cf. European Patent Application 146,785) are digested with restriction endonucleases BamHI and EcoRI. The resulting 2 DNA fragments are separated on a 0.6% low melting agarose gel in Tris-borate-EDTA buffer pH 8.3. The 221 bp fragment is isolated.

0.1 pmole (0.45 μg) of the 6.85 kb BamHI plasmid fragment, 0.2 pmole (70 ng) of the 534 bp BamHI-EcoRI PHO5 promoter fragment and 0.2 pmole (29 ng) of the 221 bp EcoRI-BamHI fragment of pML 147 (contained in small gel blocks of low melting agarose) are pooled, liquified at 65° C., diluted to twice the volume and ligated with 16 units of T4 DNA ligase (BOEHRINGER, Mannheim) at 15° C. for 16 hours.

The orientation of the 3 fragments in the prepared expression plasmid is analysed by HindIII/EcoRI double digestion. A plasmid in the correct orientation is isolated and designated as pJDB207R/PHO5-EGL.

The plasmid pJDB207R/PHO5-EGL is transformed into Saccharomyces cerevisiae strain GRF 18. Transformed yeast cells are selected on yeast minimal media plates deficient in leucine. Single transformed yeast colonies are isolated and referred to as Saccharomyces cerevisiae GRF 18/pJDB207R/PHO5-EGL.

Cells of S. cerevisiae GRF 18/pJDB207R/PHO5-EGL are grown in 300 ml of yeast minimal medium (DIFCO Yeast Nitrogen Base without aminoacids to which 2% glucose and 20 mg/l L-histidine are added), with shaking at 30° C. for 24 hours, to a density of $3 \times 10^7$ cells/ml. The cells are washed in 0.9% NaCl and used to inoculate 3 l of low $P_i$ minimal medium prepared according to the recipe of the DIFCO Yeast Nitrogen Base medium (without amino-acids) with 0.03 g/l $KH_2PO_4$, 1 g/l KCl, 10 g/l L-asparagine instead of $(NH_4)_2SO_4$, 2% glucose and 1 g/l L-histidine. The medium is inoculated to an optical density $OD_{600}$ of 0.25. The cells are grown in a Mini-Bioreactor (firm BRN) at 30° C. for 24 hours with stirring at 500 rpm and harvested at an optical density $OD_{600}$ of 1.9.

The 3 l harvest of the transformed yeast cells is cooled to 4° C. and centrifuged. The cells in the pellet are resuspended in 150 ml buffer [50 mM phosphate pH 6.4, 4 mM ZWITTERGENT ® (Surfactant of CALBIOCHEM)] and disrupted by glass beads. The homogenate is centrifuged and the supernatant diluted with an equal amount of 2% acetic acid. The suspension is centrifuged for 15 min. at 4000 rpm, the precipitate separated and the opaque supernatant again centrifuged for 60 min at 12,000 rpm.

(b) Separation of the transformed S. Cerevisiae strain

The clear supernatant is passed through the chromatography column of Example 20, which is filled with the anionically modified polysaccharide according to Example 5. The bed volume, i.e. the volume of the stationary phase, is 32 ml. Elution is carried out with a linear salt gradient of 5 bed volumes buffer A and 5 bed volumes buffer B (buffer A: 20 mM ammoniumacetate, pH 4.0; buffer B; 200 mM ammoniumacetate, pH 6.5; flow 43 ml per hour; fraction size: 14 ml).

$N^\alpha$-acetyl-eglin C is recovered in fractions 29–31 (15 mg) and further purified by semipreparative reversed phase HPLC, as described elsewhere (yield: 8 mg $N^\alpha$-acetyl-eglin C).

Eglin C is recovered in fractions 32–33 (24 mg).

Both recovered eglins are biologically active and chemically characterized as follows:

| Eglin C | isoelectric point | 6.5 |
|---|---|---|
| | molecular weight (FAB-MS) | 8091 |
| | N—terminal amino acid | Thr |
| $N^\alpha$—acetyl-eglin C | isoelectric point | 5.4 |
| | molecular weight (FAB-MS) | 8133 |
| | N—terminal amino acid | $N^\alpha$—Acetyl-Thr |

Eglin C from transformed yeast has the same retention times on HPLC as observed for natural eglin C from leech.

| Conditions of the RP-HPLC method | |
|---|---|
| Column: | NUCEOSIL ® C 18 (4.6 × 120) |
| Buffer A: | 0.1% of trifluoroacetic acid |
| Buffer B: | acetonitrile + 0.07% of trifluoroacetic acid |
| Salt gradient: | start with 30% buffer A, increasing in 70% buffer B within 20 minutes |
| Flow: | 0.71 ml/minute |

What is claimed is:

1. A polysaccharide separating agent which is partially substituted by radicals of the formula $Q_1^\oplus$
$R_1^\ominus$—S—CH$_2$—CH$_2$—CO—NH—CH$_2$—O—, wherein $R_1^\ominus$ is carboxy-$C_1$-$C_5$-alkyl, dicarboxy-$C_1$-$C_5$-alkyl, carboxyphenyl or ketocarboxymethyl, and $Q_1^\oplus$ is a water-soluble cation.

2. A polysaccharide according to claim 1, wherein $R_1^\ominus$ is $^\ominus$OOC—(CH$_2$)$_{\overline{m_1}}$—, $^\ominus$OOC—(CH$_2$)$_{\overline{n-1}}$—CH—,
                                                                              |
                                                                             CH$_3$ $^\oplus$OOC—(CH$_2$)$_{\overline{n-1}}$—CH—, $^\ominus$OOC—CO—CH$_2$— or
                        |
                       $^\ominus$OOC

[benzene ring with $^\ominus$OOC and $Q_1^\ominus$ substituents]

is hydrogen, an alkali metal cation or an ammonium cation, m$_1$ is an integer from 1 to 5 and n is 1 or 2.

3. A polysaccharide according to claim 1, which is partially substituted by radicals of the formula

[benzene ring with S—CH$_2$—CH$_2$—CO—NH—CH$_2$—O— and $Q_2^\oplus$, $^\ominus$OOC substituents]

$Q_1^\oplus$ $^\ominus$OOC—CH—S—CH$_2$—CH$_2$—CO—NH—CH$_2$—O—,
         |
$^\ominus$OOC—CH$_2$ $Q_1^\oplus$ $Q_1^\oplus$ $^\ominus$OOC—CH—S—CH$_2$—CH$_2$—CO—NH—CH$_2$—O— or
         |
        CH$_3$ $Q^\oplus$ $^\ominus$OOC—CH$_2$—S—CH$_2$—CH$_2$—CO—NH—CH$_2$—O— wherein $Q_1^\oplus$ Is $H^\oplus$, $K^\oplus$, $Na^\oplus$ or $NH_4^\oplus$.

4. A polysaccharide according to claim 1, which is selected from crosslinked dextran, uncrosslinked or crosslinked or crosslinked dextrins or uncrosslinked or crosslinked agarose, wherein the substitution results in alpha-glycosidic linkages, or cellulose wherein the substitution results in β-glycosidic linkages.

5. A polysaccharide according to claim 1, which has a degree of substitution of 0.1 to 0.95.

6. A chromatographic method of separating mixtures of substances containing amphoteric or cationic components, which comprises employing at stationary phase, an anionically modified polysaccharide according to claim 1.

* * * * *